United States Patent
Fritz et al.

(10) Patent No.: US 10,759,331 B2
(45) Date of Patent: Sep. 1, 2020

(54) TRAVEL DIRECTION INDICATOR MODULE AND EXTERIOR REARVIEW MIRROR ARRANGEMENT

(71) Applicant: SMR Patents S.à.r.l., Luxembourg (DE)

(72) Inventors: Daniel Fritz, Stuttgart (DE); Volker Erhart, Köngen (DE); Dénes Marosvoelgyi, Wolfschlugen (DE)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

(21) Appl. No.: 16/716,605

(22) Filed: Dec. 17, 2019

(65) Prior Publication Data
US 2020/0122630 A1 Apr. 23, 2020

Related U.S. Application Data

(63) Continuation of application No. 15/402,074, filed on Jan. 9, 2017, now Pat. No. 10,507,761, which is a
(Continued)

(30) Foreign Application Priority Data

Jul. 11, 2014 (EP) .................... 14176666

(51) Int. Cl.
| | |
|---|---|
| *B60Q 1/26* | (2006.01) |
| *F21S 43/237* | (2018.01) |
| *F21S 43/245* | (2018.01) |
| *F21S 43/243* | (2018.01) |
| *F21S 43/239* | (2018.01) |

(Continued)

(52) U.S. Cl.
CPC ............. *B60Q 1/2665* (2013.01); *B60Q 1/34* (2013.01); *B60R 1/06* (2013.01); *B60R 1/1207* (2013.01); *F21S 43/237* (2018.01); *F21S 43/239* (2018.01); *F21S 43/243* (2018.01); *F21S 43/245* (2018.01); *F21S 43/26* (2018.01); *G02B 6/00* (2013.01); *G02B 6/0078* (2013.01); *B60Q 1/2696* (2013.01)

(58) Field of Classification Search
None
See application file for complete search history.

(56) References Cited

U.S. PATENT DOCUMENTS

2016/0102834 A1* 4/2016 Yamada ............... G02B 6/0061
362/511

* cited by examiner

*Primary Examiner* — Elmito Breval
(74) *Attorney, Agent, or Firm* — MacMillan, Sobanski & Todd, LLC

(57) ABSTRACT

A travel direction indicator module for an exterior rearview mirror arrangement for a motor vehicle has at least one light source. A first light conductor associated with the at least one light source includes a multiplicity of light decoupling points. The travel direction indicator further includes a second light conductor. The light source couples a first beam part into the first light conductor at a first end and a second beam part into the second light conductor at a first end. A module housing is formed as one injection molded part in common with the first light conductor and the second light conductor. The at least one light source emits light into a single light decoupling area, which is arranged in an area of the second end of the first light conductor situated opposite the first end of the first light conductor. An exterior rearview mirror arrangement having such a travel direction indicator module is also disclosed.

20 Claims, 8 Drawing Sheets

Related U.S. Application Data continuation-in-part of application No. PCT/IB2015/054900, filed on Jun. 30, 2015.

(51) Int. Cl.
    *B60R 1/06*     (2006.01)
    *B60R 1/12*     (2006.01)
    *F21V 8/00*     (2006.01)
    *G02B 6/00*     (2006.01)
    *F21S 43/20*     (2018.01)
    *B60Q 1/34*     (2006.01)

TRAVEL DIRECTION INDICATOR MODULE AND EXTERIOR REARVIEW MIRROR ARRANGEMENT

CROSS-REFERENCE TO RELATED APPLICATIONS

This application is a continuation patent application of U.S. patent application Ser. No. 15/402,074, filed Jan. 9, 2017, now U.S. Pat. No. 10,507,761, issued Dec. 17, 2019. U.S. patent application Ser. No. 15/402,074 claims priority to International Application PCT/IB2015/054900 filed Jun. 30, 2015 which designated the U.S. and was published on Jan. 14, 2016 as International Publication Number WO 2016/005854 A1. PCT/IB2015/054900 claims priority to European Patent Application No. 14176666.7, filed Jul. 11, 2014. Thus, the subject nonprovisional application claims priority to European Patent Application No. 14176666.7, filed Jul. 11, 2014. The disclosures of these applications are incorporated herein by reference in their entirety.

BACKGROUND OF THE INVENTION

This invention relates in general to a travel direction indicator module for an exterior rearview mirror arrangement for a motor vehicle according to the independent claims and an exterior rearview mirror arrangement having such a travel direction indicator module.

Exterior rearview mirror arrangements for motor vehicles are diversely known in the state of the art. As an example, FIG. 8 depicts such an exterior rearview mirror arrangement 100, which features a mirror head 300 which can swivel relative to a mirror base 200. The mirror head 300 features a housing 400, which supports at least one mirror (not illustrated) and one travel direction indicator module 400.

For such an exterior rearview mirror arrangement, it is known from EP 0858932 B2, to arrange at least one light source of at least one light exit opening within the housing and to fill up the light exit opening with a light conductor, which is connected to the light source inside the housing. To this end, the light conductor can consist of crystal-clear plastic and its outer surface can lie within the outer contour of the housing.

It has turned out that the production of light windows which serve as light conductors, as described in EP 0858932 B2, is not easy. The light windows namely serve as light conductors for transporting light from a coupling point to a multiplicity of decoupling points provided in the light conductor so that the luminance at a final decoupling area or emission region can no longer meet legal requirements.

The production of decoupling points has alternatively been achieved by using optical films, see DE 102011103200 A1.

The legal requirements primarily relate to Regulation No. 6 of the United Nations Economic Commission for Europe, ECE R6, that is, Uniform Provisions Concerning the Approval of Direction Indicators for Motor Vehicles and Their Trailers.

A generic travel direction indicator module is known from EP 1854667 A1. To this end, there is used a lamp unit having at least two light conductor sections, which are joined together in a node which forms a decoupling area, which emits light which is guided into the two light conductor sections to the node.

EP 1391755 A2 describes another generic travel direction indicator module. A first light conductor extends from the outer edge of the housing of an exterior rearview mirror essentially horizontal to the motor vehicle and conducts coupled light from at least one first light source on an end face facing the vehicle to its opposite face in order to decouple it there essentially opposite to and transversely to the travel direction in accordance with the legally required light distribution. A second light conductor is arranged essentially behind the first light conductor and uses decoupling elements to decouple the light coupled into it from at least one second light source so as to conduct the light essentially transversely to its length on an end face facing the vehicle. The light decoupled by the second light conductor passes through the first light conductor, which is formed separately from the second light conductor.

EP 2489550 A2 also discloses a generic travel direction indicator module having a unitary light guide member, which features two light conductors, wherein light, which is coupled into the light guide member from at least one light source, is outputted from a first light conductor having first internally reflecting steps and a second light conductor having second internally reflecting steps. The first and second light conductors are configured and arranged such that the first light conductor does not interfere with light emitted from the second light conductor and the second light conductor also does not interfere with light emitted from the first light conductor.

Thus, it would be desirable to further develop the generic travel direction indicator module in such a manner that it is easy to manufacture while satisfying both esthetic and safety-related requirements.

SUMMARY OF THE INVENTION

This invention relates to rearview devices, generally. In particular, this invention relates to a travel direction indicator module having a module housing formed as one injection molded part in common with a first light conductor and a second light conductor, which emits light into a single light decoupling area and which is arranged in an area of the second end of the first light conductor situated opposite the first end of the first light conductor, wherein the first light conductor, the second light conductor, the module housing and the optical elements are formed in common.

To this end in one example, the light decoupling points can be uniformly distributed across the length of the first light conductor, and/or the first light conductor, the second light conductor, the module housing and the optical elements can be formed in common as a 2K or 1K injection molded part.

To this end, it can be provided that at least one connecting element, especially for a detachable connection like a snap-on connection, or a welding surface for an undetachable connection like a weld joint, is provided on at least one edge region of the module housing for the connection to the exterior rearview mirror arrangement and/or to an inner housing of the travel direction indicator module.

It can furthermore be provided that the second end of the second light conductor terminates before or within the light decoupling area, wherein a gap is preferably provided between the second end of the second light conductor and the light decoupling area.

Embodiment examples of the invention are also characterized in that the first and the second light conductor run at least partially in parallel, and/or the first and the second light conductor run at least partially one above the other or next to one another relative to the direction of view of a driver of the motor vehicle.

The objective of the present invention is also achieved according to the invention by a travel direction indicator module for an exterior rearview mirror arrangement for a motor vehicle having at least one light source, a first light conductor comprising a multiplicity of light decoupling points, and a second light conductor, wherein the light source couples a beam part into the first light conductor at a first end, and the light decoupling points are distributed across the entire length of the first light conductor between its first and second end and are provided by optical elements, wherein the first and the second light conductor is formed as one injection molded part, the first light conductor, the second light conductor and the optical elements are formed in common, and wherein the first light conductor and the second light conductor are arranged one behind the other relative to the direction of view of a driver.

In an embodiment example, the first and the second light conductor are arranged essentially in a horizontal plane, wherein the first light conductor is arranged essentially behind the second light conductor and is adjusted to emit light into the second light conductor.

To this end, the first light conductor can feature a magnifying optics. The magnifying optics preferably comprises a surface curving outwards. In an embodiment example, the magnifying optics comprises a circular arc, especially a circular arc having a ¼ circumference. The circle forming the basis of the circular arc preferably features a radius in the range of 1 mm to 6 mm. In an embodiment example, the magnifying optics points downwards relative to the direction of view of a driver.

In an embodiment example, the optical elements are arranged in a surface of the first light conductor, wherein the surface is arranged essentially perpendicular to the magnifying optics. Preferred are those the magnifying optics is adjusted to represent the optical elements in an enlarged manner.

In an embodiment example, the second light conductor comprises [features] a deflection surface, especially a deflection prism or an inclined plane, wherein the deflection surface is essentially arranged opposite the magnifying optics and is adjusted to deflect light from the magnifying optics, preferably upwards relative to the direction of view of a driver, especially to deflect up to 10° upwards relative to an optical axis.

To this end in an embodiment example, light is emitted by an emission region on the second light conductor, wherein the emission region on the second light conductor runs essentially between its first and second end, and wherein the deflection surface runs at least partially behind the emission region.

In an embodiment example, the travel direction indicator module features a module housing, wherein the first light conductor, the second light conductor, the module housing and the optical elements are formed in common, and wherein at least one connecting element, especially for a detachable connection like a snap-on connection, or a welding surface, especially for an undetachable connection like a weld joint, is provided on at least one edge region of the module housing for the connection to the exterior rearview mirror arrangement and/or to an inner housing of the travel direction indicator module.

In an embodiment example, the light source couples another beam part into the second light conductor at a first end.

The invention also delivers an exterior rearview mirror arrangement for a motor vehicle having a mirror head which can swivel relative to a mirror base, wherein at least one mirror and one travel direction indicator module are provided in the housing of the mirror head.

To this end, it can be provided that the housing of the mirror head features a light exit opening, which is filled up at least by the first light conductor or the second light conductor.

According to the invention, it is preferred that each connecting element or each welding surface of the module housing and/or the inner housing connects the travel direction indicator module to the housing of the mirror head.

The invention is thus based on the surprising realization that two light conductors which are nevertheless formed into one can provide the two light-conductor functions of a travel direction indicator module, namely satisfying the design requests on the one hand and meeting a legally specified illumination on the other hand. To this end, a first light conductor represents a design light conductor having integrated, design-based optics or decoupling points, whereas a second light conductor represents a function light conductor without design-based optics or decoupling points. The two light conductors are also preferably configured combined with a light disc. The unit made of the two light conductors is formed together with a module housing, especially as a one- or two-component injection molded part. The module housing enables the travel direction indicator module to be connected to an exterior rearview mirror arrangement and/or inner housing of the travel direction indicator module.

Moreover, the invention is based on the surprising realization that in one embodiment of the travel direction indicator module, in which the two light conductors are arranged one behind the other, it is possible to realize a higher light efficiency with one compact light conductor, which is formed out of a first and a second light conductor as one injection molded part. Because of the construction with two light conductors arranged one behind the other, it is not necessary to use any separate light windows.

Using a magnifying optics, it is possible to represent the light decoupling points or their acting surfaces in an enlarged manner. This leads to an improved light efficiency. The deflection surface makes it possible to deflect the light from the magnifying optics in such a manner that the light for an observer is deflected upwards to the optical axis. This makes it possible for oncoming traffic participants to better discern light from such a travel direction indicator module. Such a travel direction module is also easy and inexpensive to manufacture because of the magnifying optics and the deflection surface.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
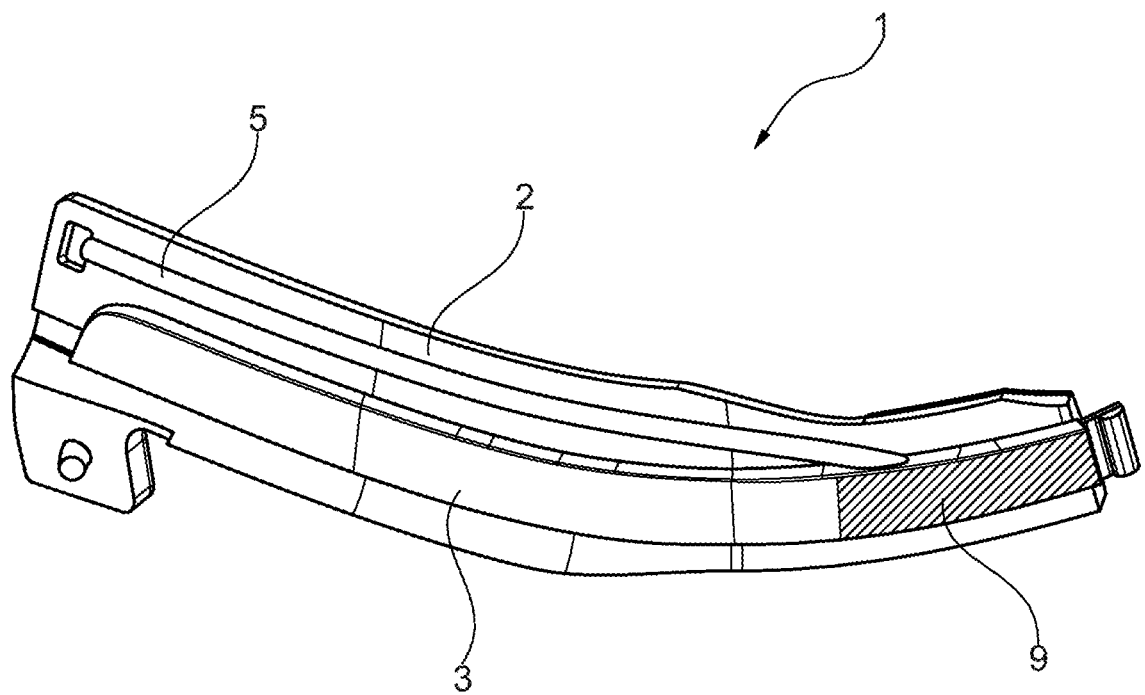
FIG. 1 is a schematic, perspective view of a travel direction indicator module according to the invention.

Referring now to the drawings, there is illustrated in FIG. 1 a travel direction indicator module according to the invention which will frequently also simply be called blinker module 1. This blinker module 1 comprises not only a module housing or housing part 2 and a first light conductor 3, but also a second light conductor 5. The first light conductor 3 represents a design light conductor having a multiplicity of decoupling points as in the form of a profile within the meaning of EP 0858932 B2 for example. Light from a light source (not illustrated in FIG. 1), which comprises at least one LED, arrived in the first light conductor 3 at a first end, shown on the left in FIG. 1, and loses luminance on its way to the second end opposite the first end, illustrated on the right in FIG. 1, via the decoupling points, so that in an emission region 9 on the second end of the first light conductor 3, a legally sufficient luminance is ensured only by the second light conductor 5. The second light conductor 5 is therefore also called function light conductor, wherein light from the light source can impinge upon it on its first end, illustrated on the left in FIG. 1, and it emits this light into the emission region 9 essentially without loss, so that the emission region 9 actually also meets ECE R6.

A driver of a vehicle which is equipped with the blinker module 1 of FIG. 1 looks at the blinker module 1 from left to right. In the direction of view of the driver, the two light conductors 3 and 5 according to FIG. 1 run at least partially in parallel and one above the other. But the invention is not limited to this, but also comprises an at least partially parallel arrangement of the two light conductors next to one another. To this end, for example, the light conductor 3 can run in the plane of the page of FIG. 1 and the light conductor 5 can run below the plane of the page.

Figure 2A:
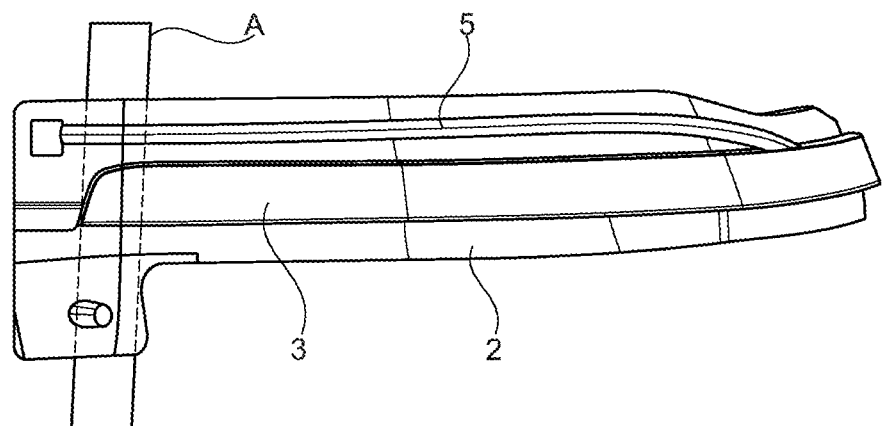
FIG. 2a is an elevational view of the travel direction indicator module of FIG. 1 showing a cross sectioning plane A.
Figure 2B:
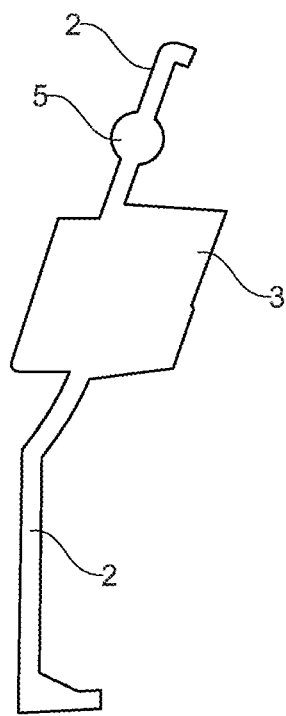
FIG. 2b is a cross sectional view of the travel direction indicator of FIG. 2a taken along plane A.
Figure 3A:
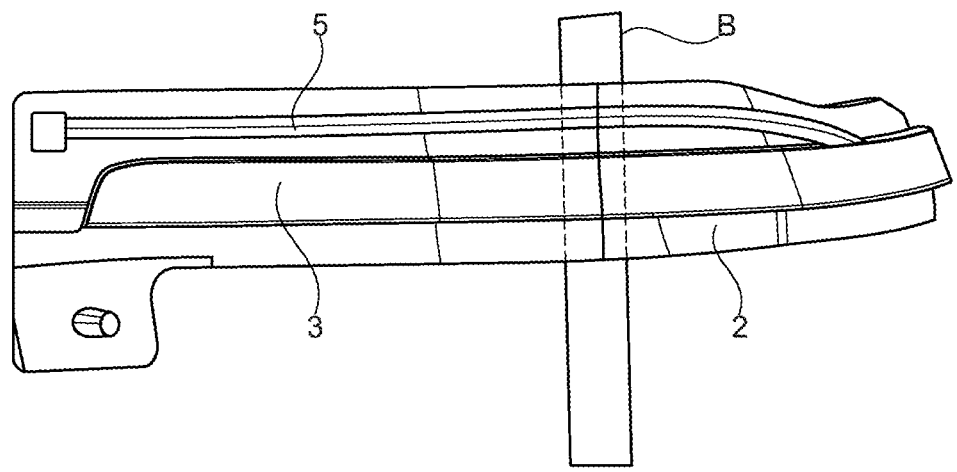
FIG. 3a is an elevational view of the travel direction indicator module of FIG. 1 showing a cross sectioning plane B.
Figure 3B:
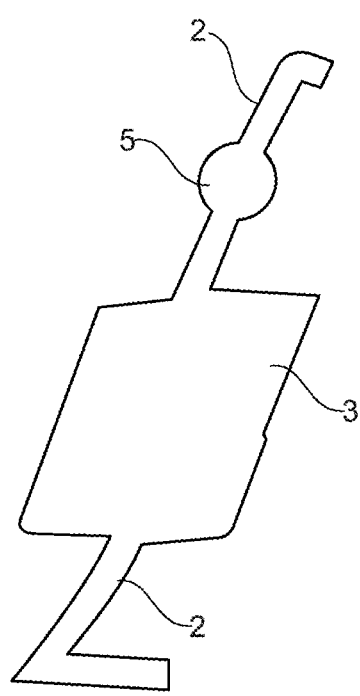
FIG. 3b is a cross sectional view of the travel direction indicator of FIG. 3a taken along plane B.
Figure 4A:
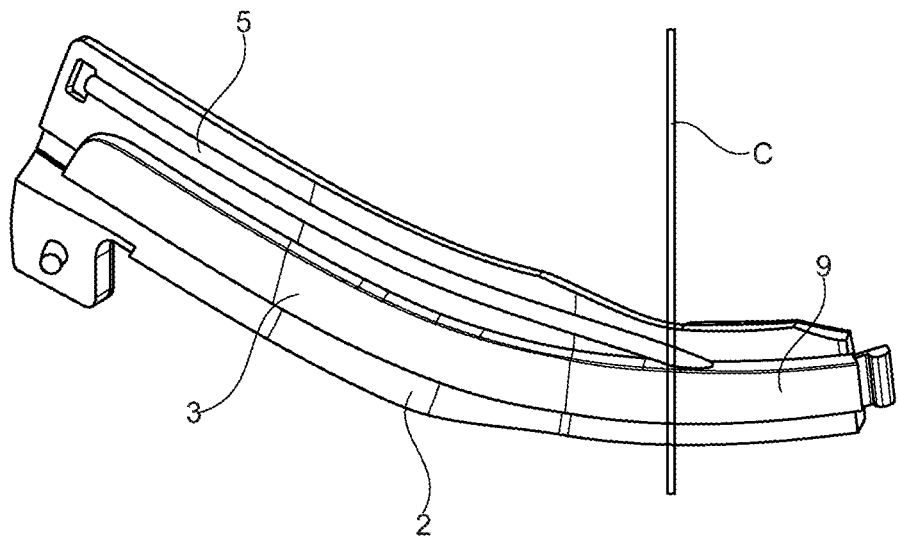
FIG. 4a is an elevational view of the travel direction indicator module of FIG. 1 showing a cross sectioning plane C.
Figure 4B:
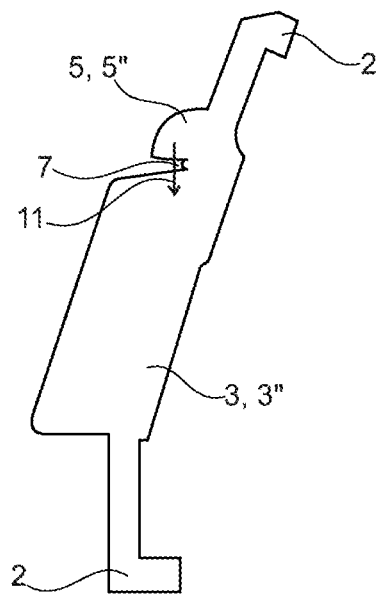
FIG. 4b is a cross sectional view of the travel direction indicator of FIG. 4a taken along plane C.

FIGS. 2a, 3a and 4a illustrate views according to FIG. 1 in which a sectional plane is additionally illustrated in each, and the corresponding section views are found in FIGS. 2b, 3b and 4b respectively. The relative path of the two light conductors 3, 5 can be distinguished on the basis of these figures. To be exact, from their respective first ends 3' or 5', the two light conductors 3, 5 run in parallel over a large portion of the blinker module 1 and only on its second end 5" does the second light conductor 5 approach the second end 3" of the first light conductor 3 in order to feed light beams 11 across a gap 7 into the emission region 9. Alternatively, the second light conductor can also flow directly into the emission region of the first light conductor.

Moreover, the geometry of the housing part 2, which is formed together with the two light conductors 3 and 5 as one injection molded part, is evident from the FIGS. 2a, 3a and 4b. On its open, opposing edge regions 2', 2", the housing part 2 can be formed with connecting elements or welding surfaces, which enable blinker module 1 to be connected to an unillustrated inner housing of blinker module 1 or else directly to the exterior rearview mirror arrangement. To this end, the connecting elements of the blinker module 1 can engage complementary connecting elements of the exterior rearview mirror arrangement, or else the welding surfaces make it possible to weld the housing part 2 to an inner housing, which represents another housing part by means of which an attachment of the blinker module 1 to the remaining exterior rearview mirror arrangement is then possible.

Figure 5:
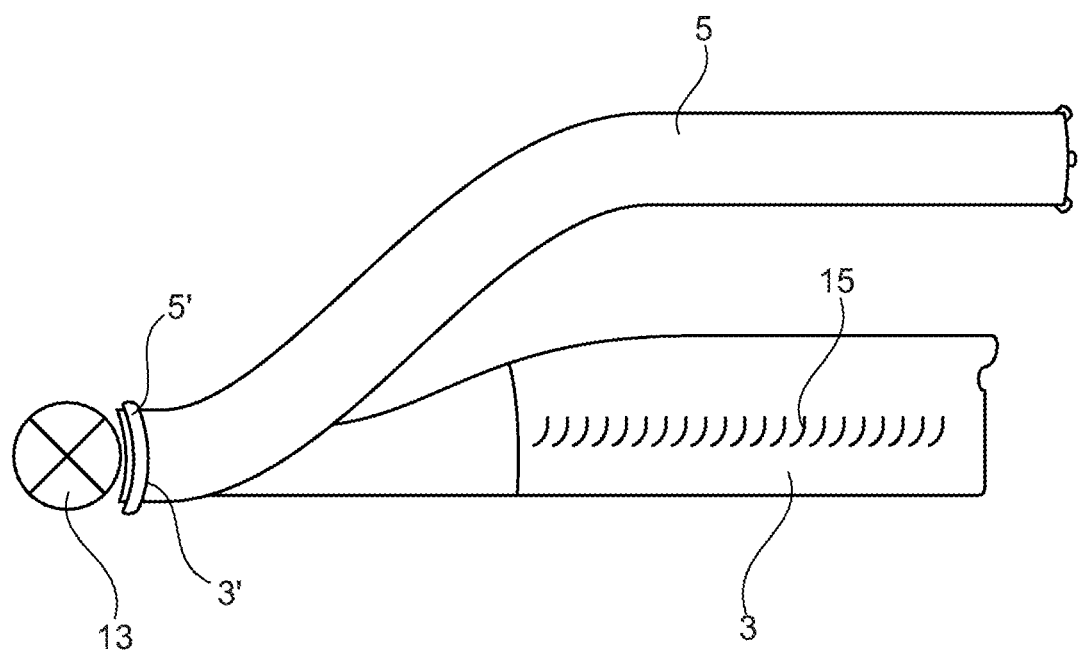
FIG. 5 is a schematic view of two light conductors and a light source of the travel direction indicator module of FIG. 1.

FIG. 5 schematically indicates how a light source 13 couples light into the first end 3' of the first light conductor 3 and into the first end 5' of the second light conductor 5. To this end, light decoupling points 15 are also indicated in the first light conductor 3. Not visible in FIG. 5 are the two respective ends of the two light conductors 3, 5, for which we refer particularly to the FIGS. 4a and 4b.

The blinker module 1 according to the invention can be introduced into an exterior rearview mirror arrangement (not illustrated) in conventional manner, as described in EP 0858932 B2 for example. It is characterized by its diverse design options with respect to the first light conductor 3 without losing luminance in the emission region 9 due to the second light conductor 5, which is formed in common with the first light conductor 3.

Figure 6A:
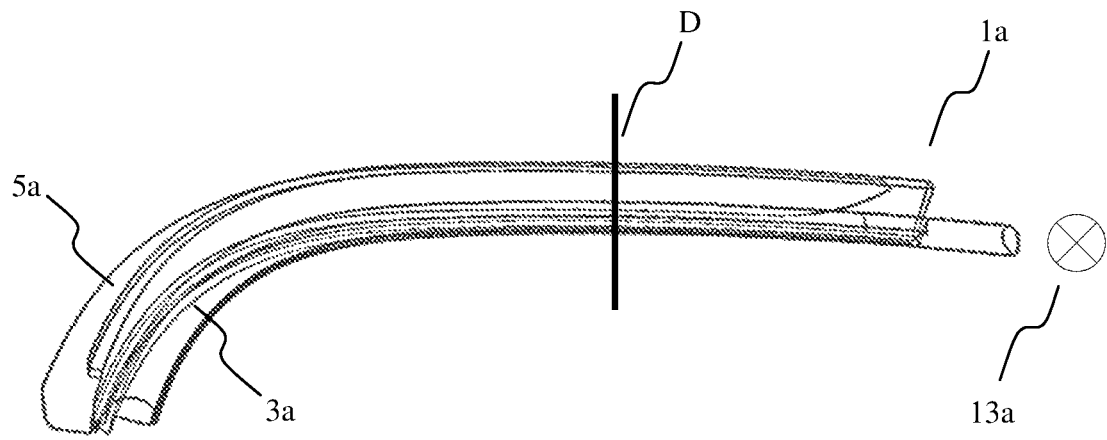
FIG. 6a is a schematic view of a travel direction indicator module according to the invention in accordance with another embodiment of the invention and showing a cross sectioning plane D. a section view of same along a plane D

FIG. 6a depicts a schematic view of a travel direction indicator module 1a according to the invention in accordance with another embodiment of the invention. FIG. 6a additionally shows a sectional plane D. The corresponding section view is found in FIGS. 6b and 6c. The relative path of the two light conductors 3a, 5a can be discerned on the basis of FIG. 6a. To be exact, from their respective first ends the two light conductors 3a, 5a run in parallel over a large portion of the travel direction indicator module 1a. However, the person skilled in the art knows that the light source 13a can also couple another beam part into the second light conductor 5a at a first end (not illustrated in FIG. 6a).

Figure 6B:
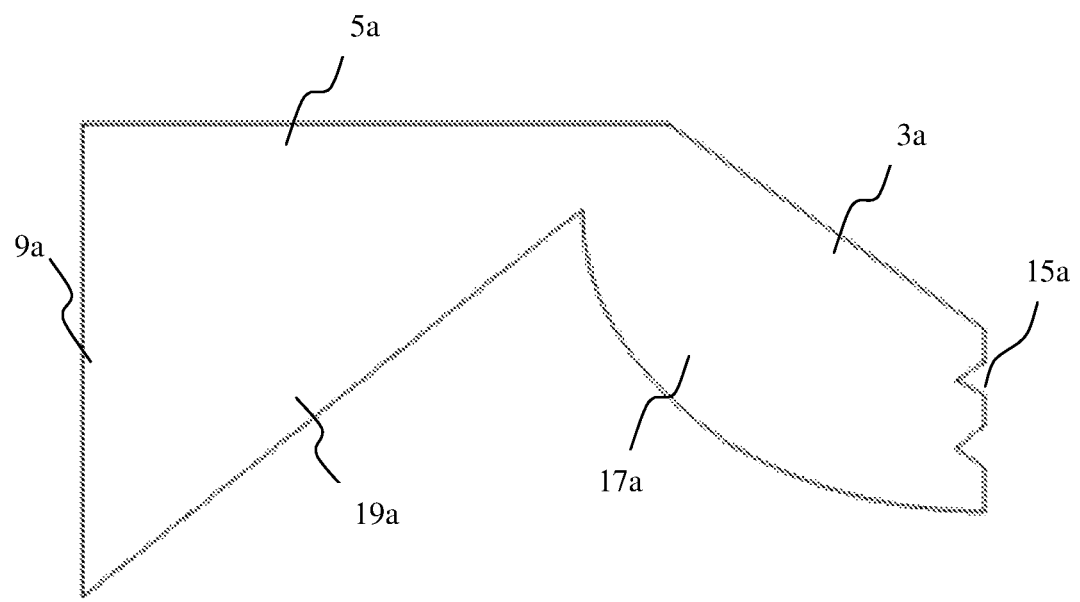
FIG. 6b is a cross sectional view of the travel direction indicator of FIG. 6a taken along plane D.

FIG. 6b depicts a section view of the travel direction indicator module 1a of FIG. 6a along the sectional plane D. The section view depicted in FIG. 6b is similar to the section views shown in the FIGS. 2b, 3b and 4b, but FIG. 6b shows only the first light conductor 3a and the second light conductor 5a. However, the person skilled in the art knows that the light conductors 3a, 5a illustrated in FIG. 6b can be connected to a housing as shown in FIGS. 2b, 3b and 4b. The position of the cut which is shown in FIG. 6b could also essentially relate to any point between the first and the second ends of the light conductors 3a, 5a.

Figure 6C:
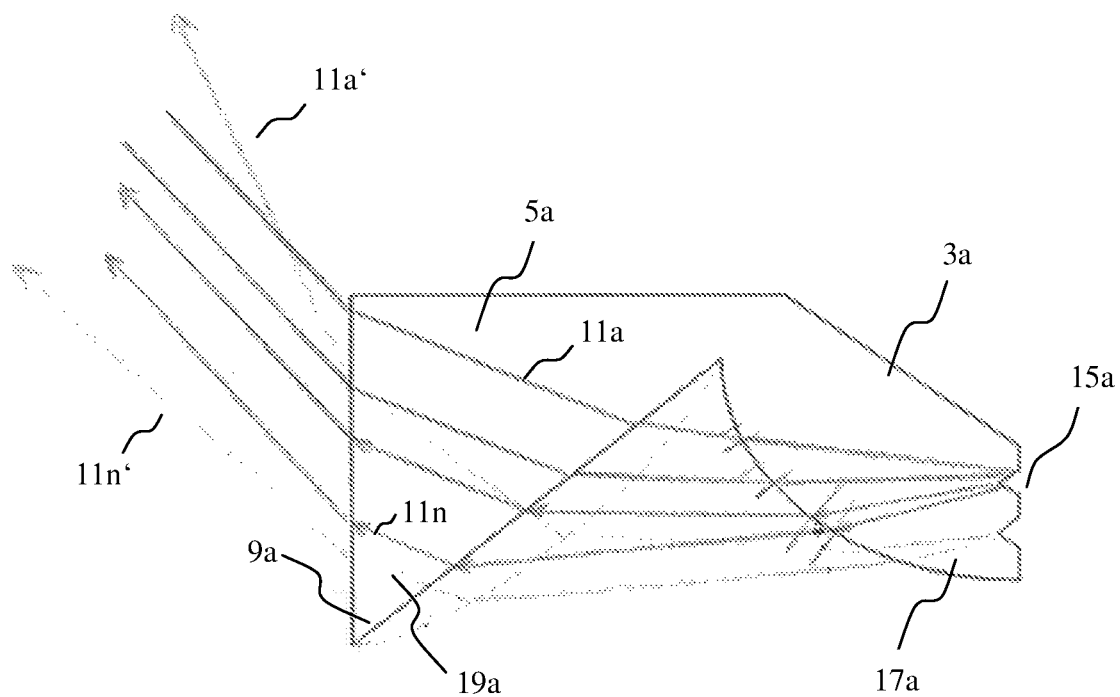
FIG. 6c depicts the section view of FIG. 6b with an exemplary beam path.

As depicted in FIG. 6b, the first light conductor 3a comprises a multiplicity of light decoupling points 15a. The person skilled in the art knows that the light decoupling points 15a can be formed by any geometry that is suitable for decoupling coupled light from one end face essentially opposite to and/or transversely to the travel direction. FIG. 6b also shows that the first and the second light conductor 3a, 5a is essentially arranged in a horizontal plane, and the first light conductor 3a is arranged behind the second light conductor 5a, so that the decoupled light from the first light conductor 3a can be emitted into the second light conductor 5a. The magnifying optics 17a illustrated on the first light conductor 3a is shown as a ¼-circular area in order to enlarge the light decoupling points 15a and their acting surface. The light from the magnifying optics 17a is deflected upwards by the deflection surface 19a on the second light conductor 5a and emerges from the emission region 9a illustrated in FIG. 6 into the second light conductor 5a. To this end, the light can be emitted at an angle of up to 10° upwards relative to an optical axis (not illustrated). FIG. 6c therefore illustrates the section view depicted in FIG. 6b with an exemplary beam path. As already described in relation to FIG. 6b, the depicted light beams 11a-11n, 11a'-11n' are deflected upwards. As an example, FIG. 6 illustrates yet another embodiment in which a convex curvature is arranged on the deflection surface 19a in order to achieve a wider scattering of the light beams 11a'-11n'. But the person skilled in the art knows that this convex curvature is not essential for the functionality of the travel direction module.

Figure 7A:
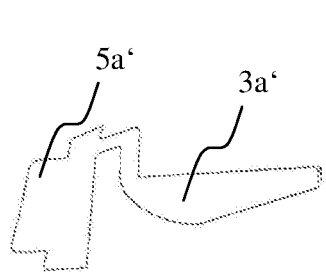
FIG. 7a is a cross sectional view of another embodiment of a travel direction indicator module according to the invention.
Figure 7B:
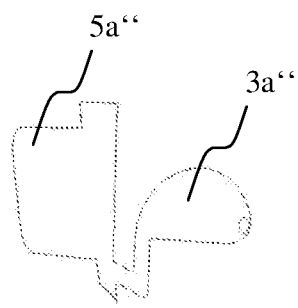
FIG. 7b is a cross sectional view of yet another embodiment of a travel direction indicator module according to the invention.
Figure 7C:
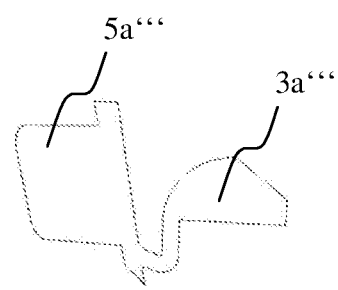
FIG. 7c is a cross sectional view of yet another embodiment of a travel direction indicator module according to the invention.
Figure 8:
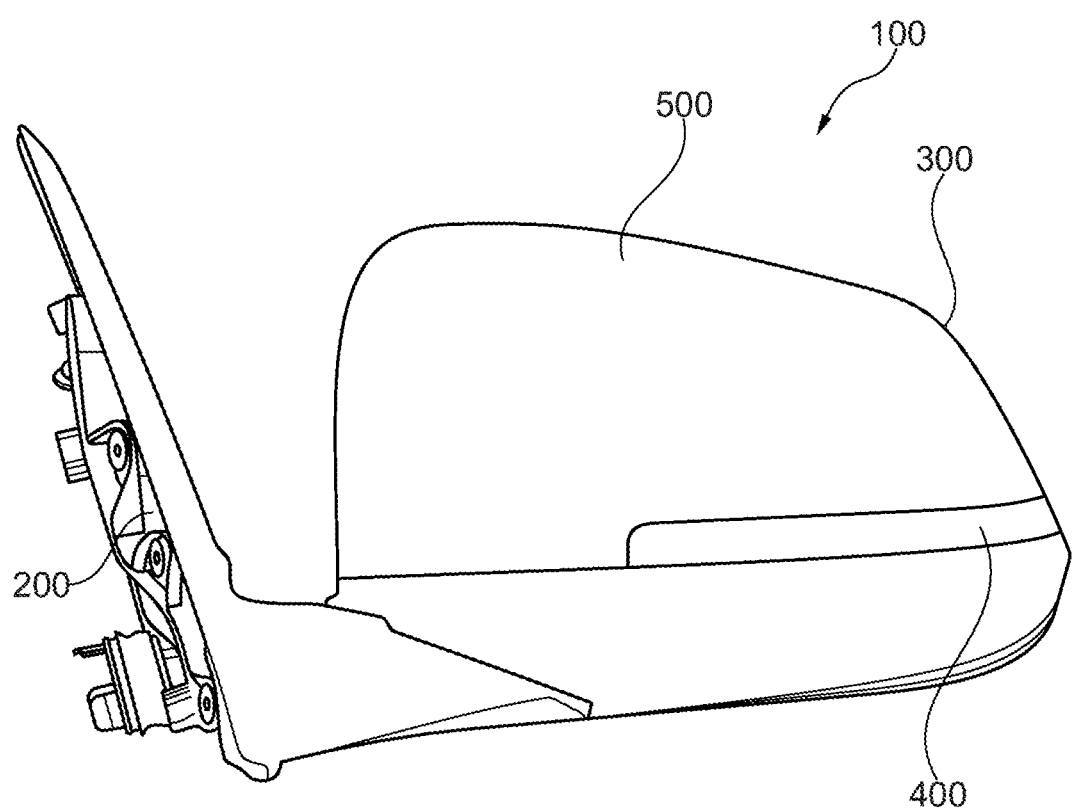
FIG. 8 is a schematic view of a prior art exterior rearview mirror arrangement for a motor vehicle having a travel direction indicator module.

FIGS. 7a, 7b and 7c depict section views of other embodiments of the travel direction indicator module according to the invention. In the depicted embodiments, the first and the second light conductors 3a'-3a''', 5a'-5a''' are each realized by different configurations.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A travel direction indicator module for an exterior rearview mirror arrangement for a motor vehicle comprising:
at least one light source;
a first light conductor comprising a multiplicity of light decoupling points, and a second light conductor, wherein
the at least one light source couples a first beam part into the first light conductor at a first light conductor first end and a second beam part into the second light conductor at a second light conductor first end,
the first and the second light conductor run at least partially in parallel or the first and the second light conductor run at least partially one above the other,
the first light conductor is adjusted to emit light into an emission region that couples light from the at least one light source to the second light conductor, and
the light decoupling points are distributed across the entire length of the first light conductor between the first light conductor first end and a first light conductor second end.

2. The travel direction indicator module according to claim 1 having a module housing, and wherein at least one of a detachable connecting element or a fixed connection surface is provided on at least one edge region of the module housing for connecting to the exterior rearview mirror arrangement or connecting to an inner housing of the travel direction indicator module.

3. The travel direction indicator module according to claim 1, wherein a second end of the second light conductor terminates before or within a light decoupling area, wherein a gap is provided between the second end of the second light conductor and the light decoupling area.

4. The travel direction indicator module according to claim 1, wherein the first and the second light conductor run at least partially in parallel.

5. The travel direction indicator module according to claim 1, wherein the first and the second light conductor run at least partially one above the other or next to one another relative to the direction of view of a driver of the motor vehicle.

6. The travel direction indicator module according to claim 1, wherein the light decoupling points are provided by optical elements.

7. The travel direction indicator module according to claim 6, wherein the optical elements are arranged on a surface of the first light conductor and the surface is arranged generally perpendicular to at least one magnifying optic.

8. The travel direction indicator module according to claim 6 having a module housing, and wherein at least one of a detachable connecting element or a fixed connection surface is provided on at least one edge region of the module housing for connecting to the exterior rearview mirror arrangement, and the module housing and the optical elements are formed in common.

9. The travel direction indicator module according to claim 6, wherein the first light conductor, the second light conductor and the optical elements are formed in common.

10. The travel direction indicator module according to claim 1 wherein the emission region is located on a first light conductor second end and is connected to the second light conductor.

11. The travel direction indicator module according to claim 10 wherein a gap extends between a portion of the emission region and the second light conductor.

12. A travel direction indicator module for an exterior rearview mirror arrangement for a motor vehicle comprising:
at least one light source;
a first light conductor comprising a multiplicity of light decoupling points; and
a second light conductor, wherein
the at least one light source couples a first beam part into the first light conductor at a first light conductor first end and a second beam part into the second light conductor at a first end of the second light conductor,
the first and the second light conductors are oriented at least partially in parallel or oriented at least partially one above the other,
the first light conductor is adjusted to emit light into the second light conductor, and
the second light conductor is associated with a deflection surface, with the deflection surface being adjusted to deflect light from the first light conductor.

13. The travel direction indicator module according to claim 12, wherein the first and the second light conductors are arranged in a generally horizontal plane.

14. The travel direction indicator module according to claim 12, wherein the first light conductor includes magnifying optics.

15. The travel direction indicator module according to claim 14, wherein optical elements are arranged on a surface of the first light conductor and the surface is arranged essentially perpendicular to the magnifying optics such that the optical elements are projected in an enlarged manner.

16. The travel direction indicator module according to claim 14, wherein the deflection surface is configured as one of a deflection prism or an inclined plane, the deflection surface arranged opposite the magnifying optics and adjusted to deflect light from the magnifying optics in the direction of view of a driver.

17. The travel direction indicator module according to claim 14, wherein light is emitted by an emission region on the second light conductor, wherein the emission region on the second light conductor extends between the second light conductor first and second ends, and wherein the deflection surface runs at least partially behind the emission region.

18. A travel direction indicator module for an exterior rearview mirror arrangement for a motor vehicle comprising:
   at least one light source;
   a first light conductor comprising a multiplicity of light decoupling points and a magnifying optic; and
   a second light conductor, wherein
   the at least one light source couples a first beam part into the first light conductor at a first end and a second beam part into the second light conductor at a first end of the second light conductor,
   the first and the second light conductors are oriented at least partially in parallel or oriented at least partially one above the other, and
   the first light conductor is adjusted to emit light into the second light conductor.

19. The travel direction indicator module according to claim 18, wherein the second light conductor includes an emission region and a deflection surface at least partially behind the emission region such that light is emitted from the first light conductor onto the deflection surface of the second light conductor and projected out of the emission region.

20. The travel direction indicator module according to claim 18, wherein the first light conductor includes magnifying optics and optical elements are arranged on a surface of the first light conductor, the surface being generally perpendicular to the magnifying optics to project the optical element in an enlarged form.

* * * * *

UNITED STATES PATENT AND TRADEMARK OFFICE
CERTIFICATE OF CORRECTION

PATENT NO. : 10,759,331 B2  
APPLICATION NO. : 16/716605  
DATED : September 1, 2020  
INVENTOR(S) : Fritz et al.

Page 1 of 1

It is certified that error appears in the above-identified patent and that said Letters Patent is hereby corrected as shown below:

On the Title Page

Item (71), please correct the Applicant from:  
"SMR Patents S.à.r.l., Luxembourg (DE)"

To:  
--SMR Patents S.à.r.l., Luxembourg (LU)--

Signed and Sealed this  
Tenth Day of November, 2020

Andrei Iancu  
*Director of the United States Patent and Trademark Office*